United States Patent
Chen

(10) Patent No.: US 6,612,201 B1
(45) Date of Patent: Sep. 2, 2003

(54) BICYCLE PEDAL ASSEMBLY WITH ADJUSTABLE ANTI-SLIP MEMBERS

(76) Inventor: Chung-I Chen, No. 3, Kung-Chi Rd., Yu-Ssi-Kung-Yeh Dist., Ta-Chia Chen, Taichung Hsien (TW)

(*) Notice: Subject to any disclaimer, the term of this patent is extended or adjusted under 35 U.S.C. 154(b) by 6 days.

(21) Appl. No.: 10/106,057

(22) Filed: Mar. 27, 2002

(51) Int. Cl.[7] ................................................. G05G 1/14
(52) U.S. Cl. ....................................... 74/594.4; D12/125
(58) Field of Search ............................ 74/594.1–594.6; D12/125; 36/131, 132; 482/57

(56) References Cited

U.S. PATENT DOCUMENTS

| | | | | |
|---|---|---|---|---|
| 955,957 A | * | 4/1910 | Francis | 74/594.4 |
| 2,024,499 A | * | 12/1935 | Baron | 74/594.4 |
| 3,807,255 A | * | 4/1974 | Baginski | 74/594.4 |
| D280,192 S | * | 8/1985 | Watanabe | D12/125 |
| 4,599,915 A | * | 7/1986 | Hlavac et al. | 74/594.4 |
| D286,995 S | * | 12/1986 | Pai | D12/125 |
| 4,628,763 A | * | 12/1986 | Konzorr | 74/594.6 |
| D302,668 S | * | 8/1989 | Chounan | D12/125 |
| 5,806,379 A | * | 9/1998 | Nagano | 74/594.6 |
| 6,241,639 B1 | * | 6/2001 | Hervig | 482/57 |
| 2002/0073801 A1 | * | 6/2002 | Steinberg | 74/594.6 |
| 2002/0152835 A1 | * | 10/2002 | Chang | 74/594.1 |

FOREIGN PATENT DOCUMENTS

| | | | | |
|---|---|---|---|---|
| DE | 3526773 A1 | * | 1/1987 | 74/594.4 |
| DE | 3822623 A1 | * | 1/1990 | 74/594.4 |
| JP | 5-32189 | * | 2/1993 | 74/594.4 |

* cited by examiner

Primary Examiner—Vinh T. Luong
(74) Attorney, Agent, or Firm—Foley & Lardner

(57) ABSTRACT

A bicycle pedal assembly includes a pedal body and a plurality of anti-slip members. The pedal body includes a longitudinal tubular portion and left and right lateral walls having distal parts formed with a respective recess. The recess has a bottom formed with an internally threaded fastener hole. Each anti-slip member includes a screw having a shank that threadedly engages the fastener hole in the recess in the distal part of one of the lateral walls, and an anti-slip block having an anchoring portion secured to a head of the screw, and a contact portion that projects upwardly relative to the top side of the left and right lateral walls.

10 Claims, 6 Drawing Sheets

BICYCLE PEDAL ASSEMBLY WITH ADJUSTABLE ANTI-SLIP MEMBERS

BACKGROUND OF THE INVENTION

1. Field of the Invention

The invention relates to a bicycle pedal, more particularly to a bicycle pedal assembly with adjustable anti-slip members.

2. Description of the Related Art

One example of a conventional bicycle pedal assembly is designed for use with a shoe that has no cleat mounted thereon. Such a bicycle pedal assembly is disadvantageous in that no means is provided to resist slipping of the cyclist's shoe during use.

SUMMARY OF THE INVENTION

Therefore, the main object of the present invention is to provide a bicycle pedal assembly with adjustable anti-slip members for resisting slipping of a cyclist's shoe during use.

According to the present invention, a bicycle pedal assembly is adapted to be mounted on a bicycle pedal shaft and comprises a one-piece pedal body and a plurality of anti-slip members. The pedal body includes a longitudinal tubular portion adapted to be mounted rotatably on the pedal shaft, and left and right lateral walls extending transversely and oppositely from the tubular portion. Each of the left and right lateral walls has a distal part remote from the tubular portion. The distal part has a top side formed with an upwardly opening recess that is confined by an annular wall. The recess further has a bottom that is formed with an internally threaded fastener hole. Each of the anti-slip members includes a screw and an anti-slip block. The screw has a shank and a head that is formed on one end of the shank. The shank threadedly engages the fastener hole in the recess in a respective one of the left and right lateral walls. The anti-slip block is made from an elastomer, and has an anchoring portion and a contact portion. The anchoring portion is secured to the head of the screw, and is received in the recess in the respective one of the left and right lateral walls. The contact portion extends from the anchoring portion outwardly of the recess, and projects upwardly relative to the top side of the distal part of the respective one of the left and right lateral walls.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
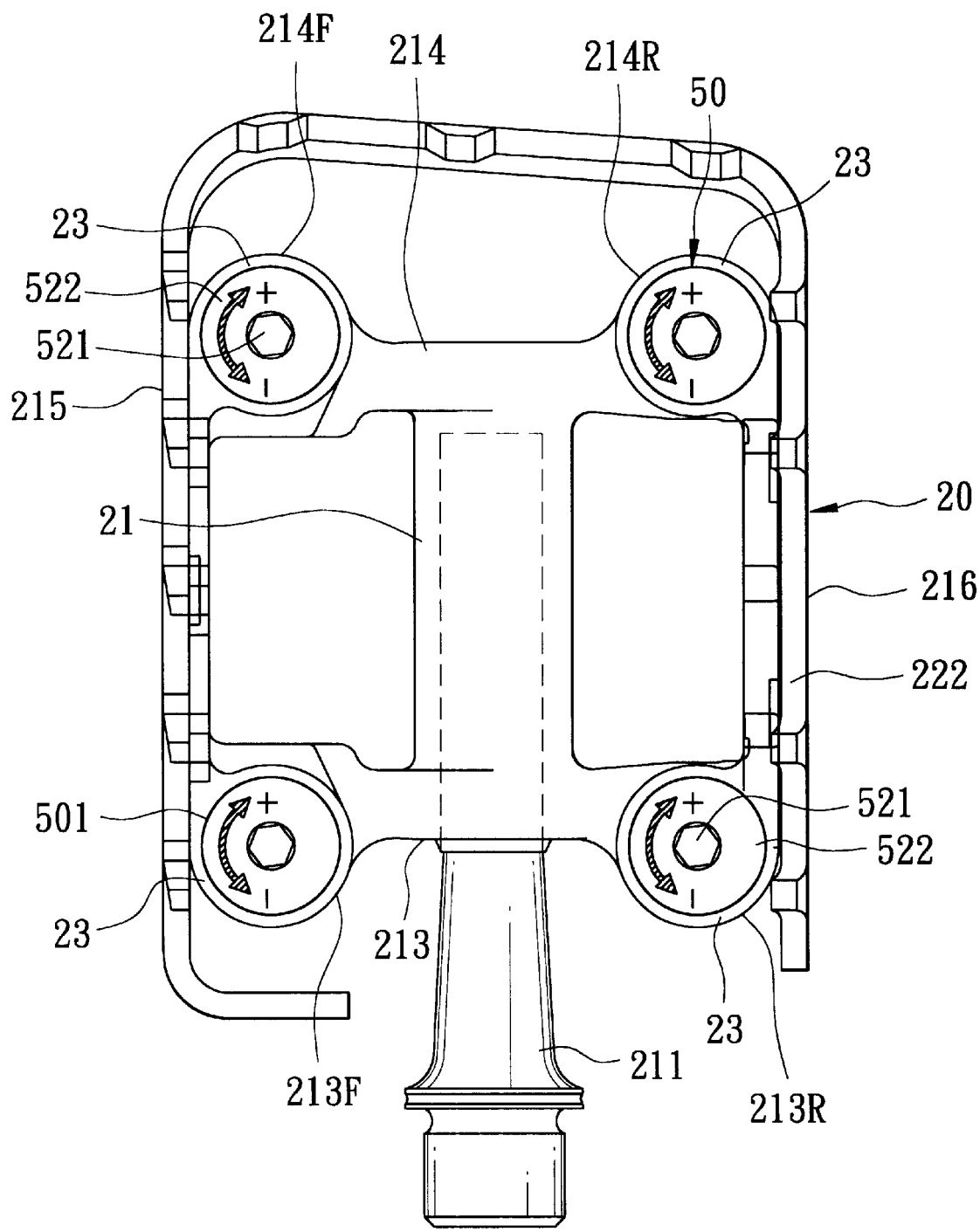
FIG. 1 is a schematic top view of the preferred embodiment of a bicycle pedal assembly according to the present invention.
Figure 2:
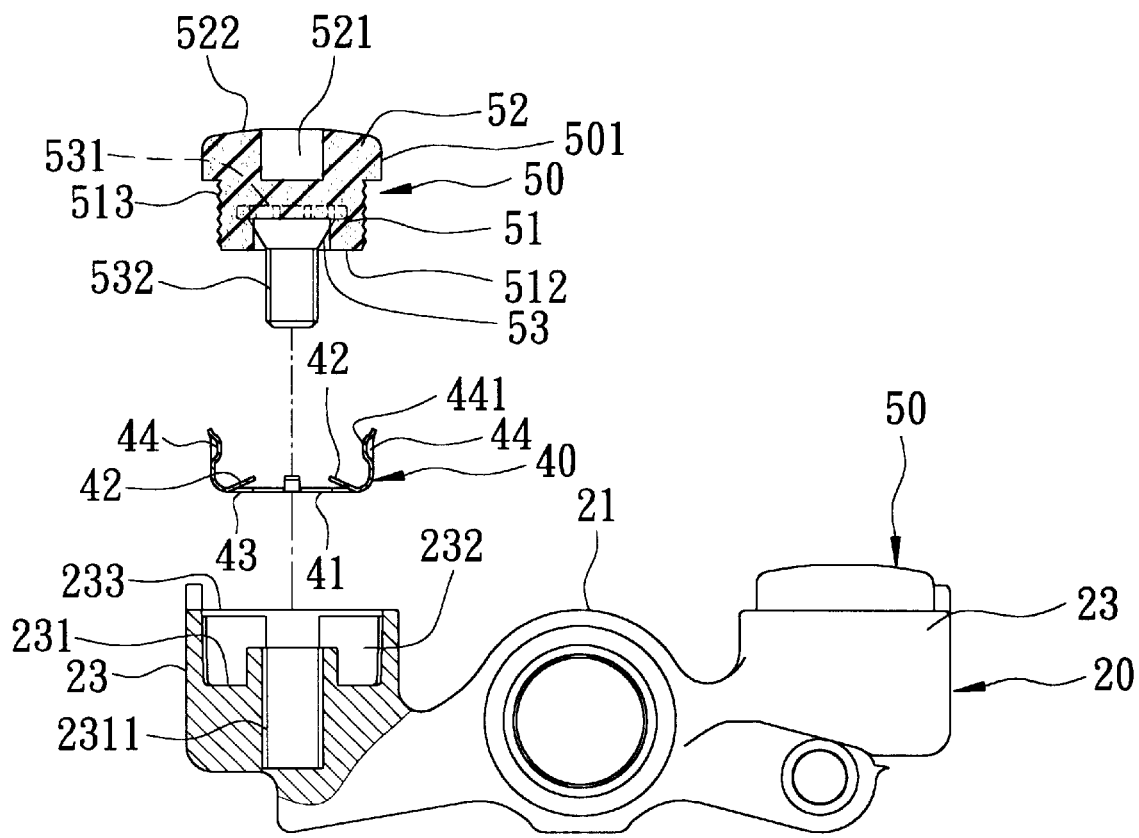
FIG. 2 is an exploded partly sectional schematic view of a pedal body, illustrating a distal part of a lateral wall, a positioning unit, and an anti-slip member of the preferred embodiment.
Figure 3:
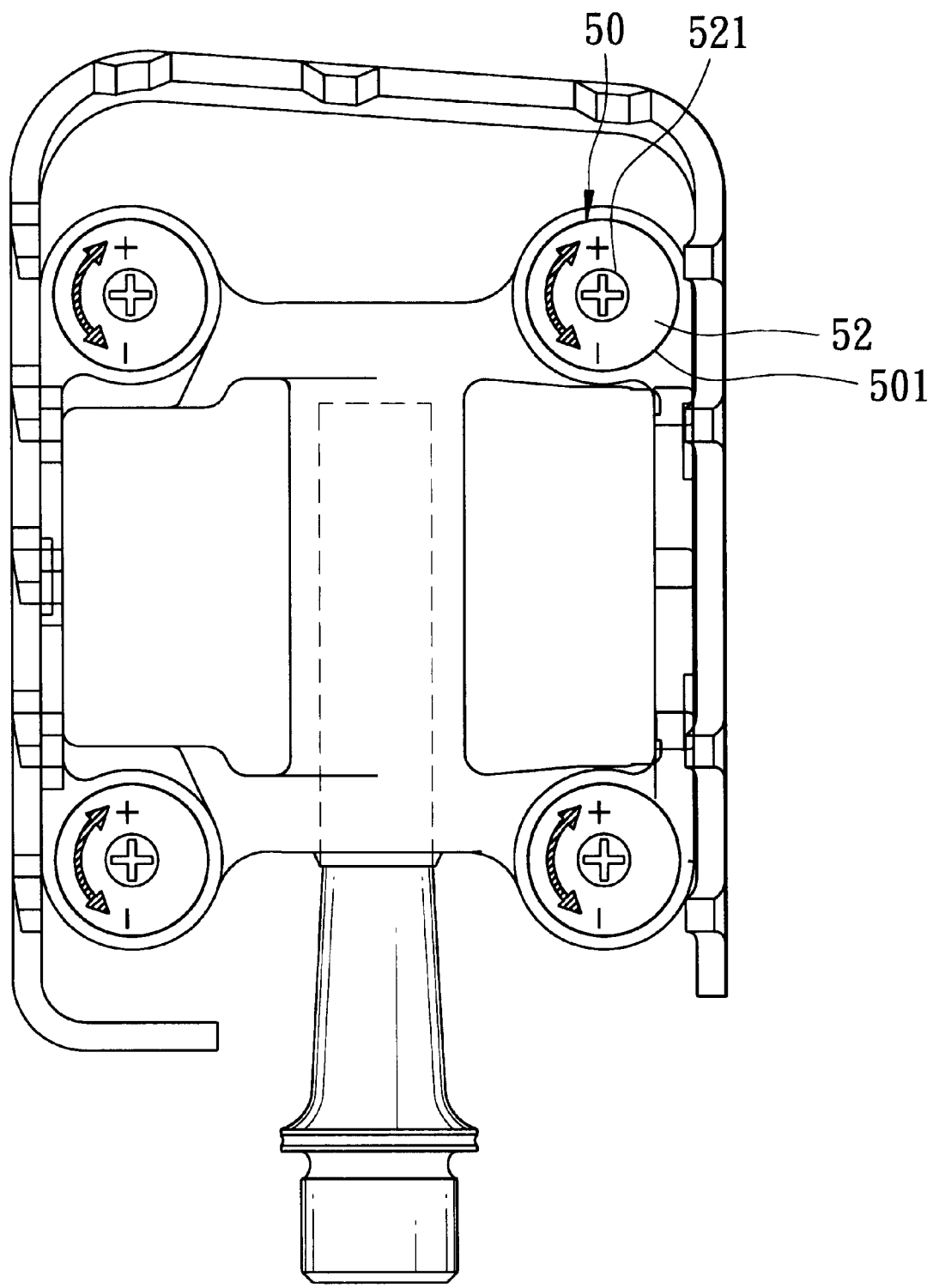
FIG. 3 is a schematic top view showing one shape of a bit engaging groove in a contact portion of an anti-slip block.
Figure 4:
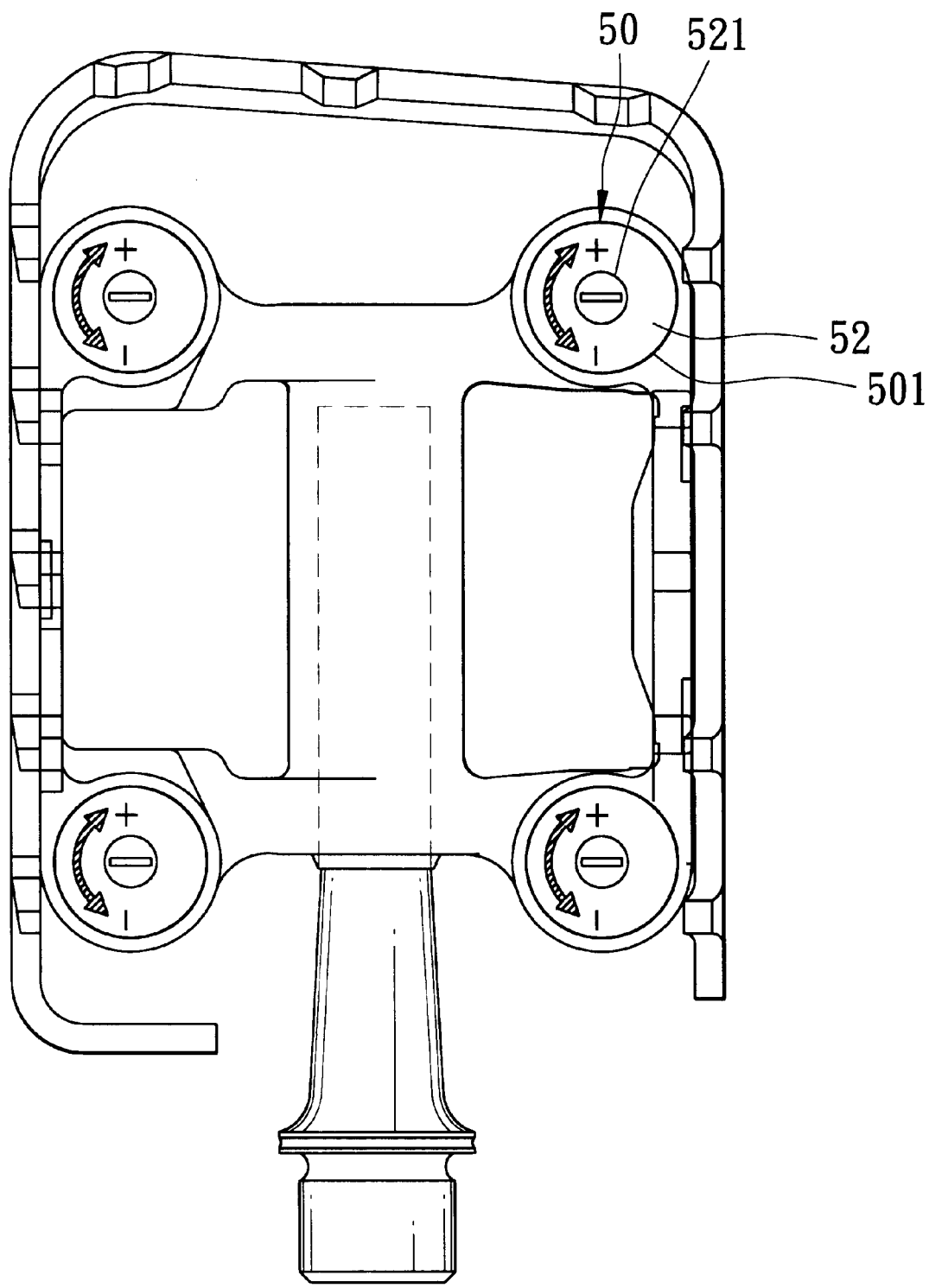
FIG. 4 is a schematic top view showing another shape of the bit engaging groove in the contact portion of the anti-slip block.

Referring to FIGS. 1 to 4, the preferred embodiment of a bicycle pedal assembly according to the present invention is shown to be adapted for mounting on a bicycle pedal shaft 211, and comprises a one-piece pedal body 20, four anti-slip members 50, and four positioning units 40 (only one is shown in FIG. 2). The pedal body 20 includes a longitudinal hollow tubular portion 21 adapted to be mounted rotatably on the pedal shaft 211, and a front pair and a rear pair of left and right lateral walls 213, 214. The left and right lateral walls 213, 214 extend transversely and oppositely from the tubular portion 21. Each of the left and right lateral walls 213, 214 has a distal part 23 remote from the tubular portion 21. Each of the distal parts 23 has a top side 233 formed with an upwardly opening recess 232 that is confined by an annular wall. Each recess 232 further has a bottom 231 that is formed with an internally threaded fastener hole 2311. The pedal body 20 further includes a front wall 215 interconnecting a front pair 213F, 214F of the left and right lateral walls 213, 214, and a rear wall 216 interconnecting a rear pair 213R, 214R of the left and right lateral walls 213, 214.

Each of the anti-slip members 50 includes a screw 53 and an anti-slip block 501. The screw 53 has a shank 532 and a head 531 that is formed on one end of the shank 532. The shank 532 threadedly engages the fastener hole 2311 in the bottom 231 of the recess 232 in a respective one of the distal parts 23 of the left and right lateral walls 213, 214. The anti-slip block 501 is made from an elastomer, and has an anchoring portion 51 and a contact portion 52. In this embodiment, the elastomer is polyurethane. The anchoring portion 51 has a bottom surface 512 and a peripheral wall surface 513, and is received in the recess 232 in the respective one of the distal parts 23 of the left and right lateral walls 213, 214. The anti-slip block 501, in this embodiment, is formed on the head 531 of the screw 53 by injection molding. The contact portion 52 extends from the anchoring portion 51 outwardly of the recess 232, and projects upwardly relative to the top side 233 of the distal part 23 of the respective one of the left and right lateral walls 213, 214. The contact portion 52 has a top surface 522 formed with a bit engaging groove 521 that is adapted to engage a tool bit (not shown). The bit engaging groove 521 can be in the shape of a cross (see FIG. 3), a polygon, or a diametral slot (see FIG. 4). In this embodiment, the bit engaging groove 521 is hexagonal in shape, as best shown in FIG. 1.

Figure 5:
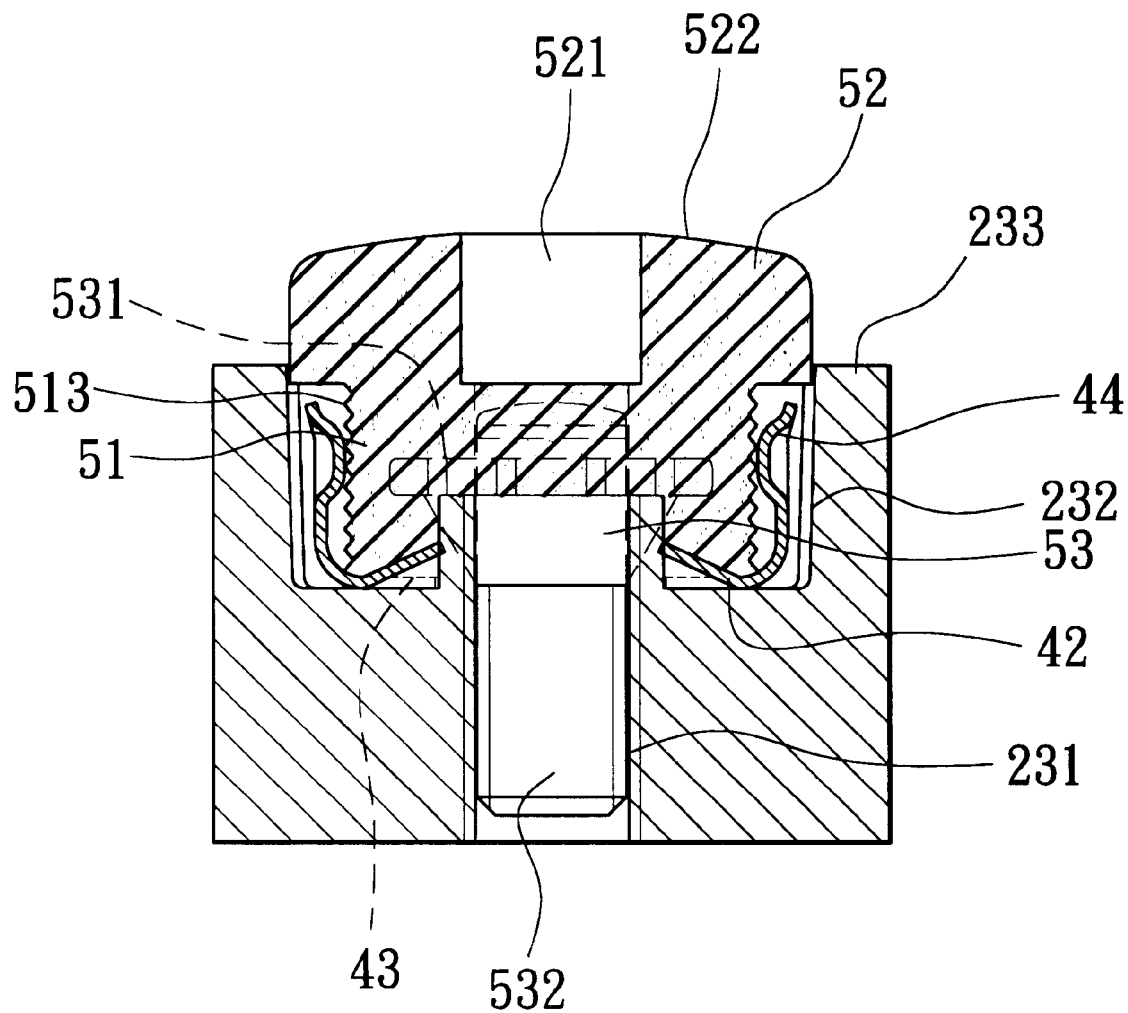
FIG. 5 is a schematic sectional view illustrating the anti-slip member in unadjusted state.

Each of the positioning units 40 is disposed in the recess 232 in a respective one of the distal parts 23 of the left and right lateral walls 231, 214. Each positioning unit 40 includes an annular base plate 43, four resilient urging tabs 42, and four resilient clamping strips 44. The annular base plate 43 is disposed on the bottom 231 of the recess 232, has an outer periphery, and is formed with a center through hole 41 that permits extension of the shank 532 of the screw 53 in the recess 232 therethrough. The through hole 41 is defined by an inner periphery of the base plate 43. The four resilient urging tabs 42 extend in radial inward directions from the inner periphery of the base plate 43, are disposed around the shank 532 of the screw 53 in the recess 232, and extend upwardly and inclinedly to abut against and engage the bottom surface 512 of the anchoring portion 51 of the anti-slip block 501 which is received in the recess 232, asbest shown in FIGS. 5 and 6. The resilient clamping strips 44 extend upwardly from the outer periphery of the base plate 43, are disposed around the anchoring portion 51 of the anti-slip block 501 which is received in the recess 232, and cooperate to apply radial inward clamping forces on the anchoring portion 51 of the anti-slip block 501. Each of the clamping strips 44 has an end part 441 remote from the base plate 43 and dented radially and inwardly for abutting against the peripheral wall surface 513 of the anchoring portion 51 of the anti-slip block 501. Preferably, the peripheral wall surface 513 is roughened for enhanced traction with the clamping strips 44.

During assembly, the positioning units 40 are first disposed in the recess 232 in the respective one of the distal parts 23 of the left and right lateral walls 213, 214, followed by the anti-slip members 50. The shank 532 of the screw 53 of each anti-slip member 50 passes through the through hole 41 in the respective one of the positioning units 40, and threadedly engages the threaded fastener hole 2311 in the recess 232 in the respective one of the distal parts 23 of the left and right lateral walls 213, 214, thereby securing the anchoring portion 51 of each anti-slip member 50 in the respective recess 232. At this time, the resilient urging tabs 42 and the resilient clamping strips 44 of each positioning unit 40 abut respectively against the bottom surface 512 and the peripheral wall surface 513 of the anchoring portion 51 of the corresponding one of the anti-slip members 50 so as to clamp the same and enhance securing of the anti-slip member 50 in the respective one of the distal parts 23 of the left and right lateral walls 213, 214.

Since the contact portion 52 of each anti-slip block 501 extends out of the pedal body 20, when a cyclist steps on the pedal body 20, the cyclist's shoe sole is in direct contact with the contact portion 52 of each anti-slip block 501 so as to minimize slipping.

Figure 6:
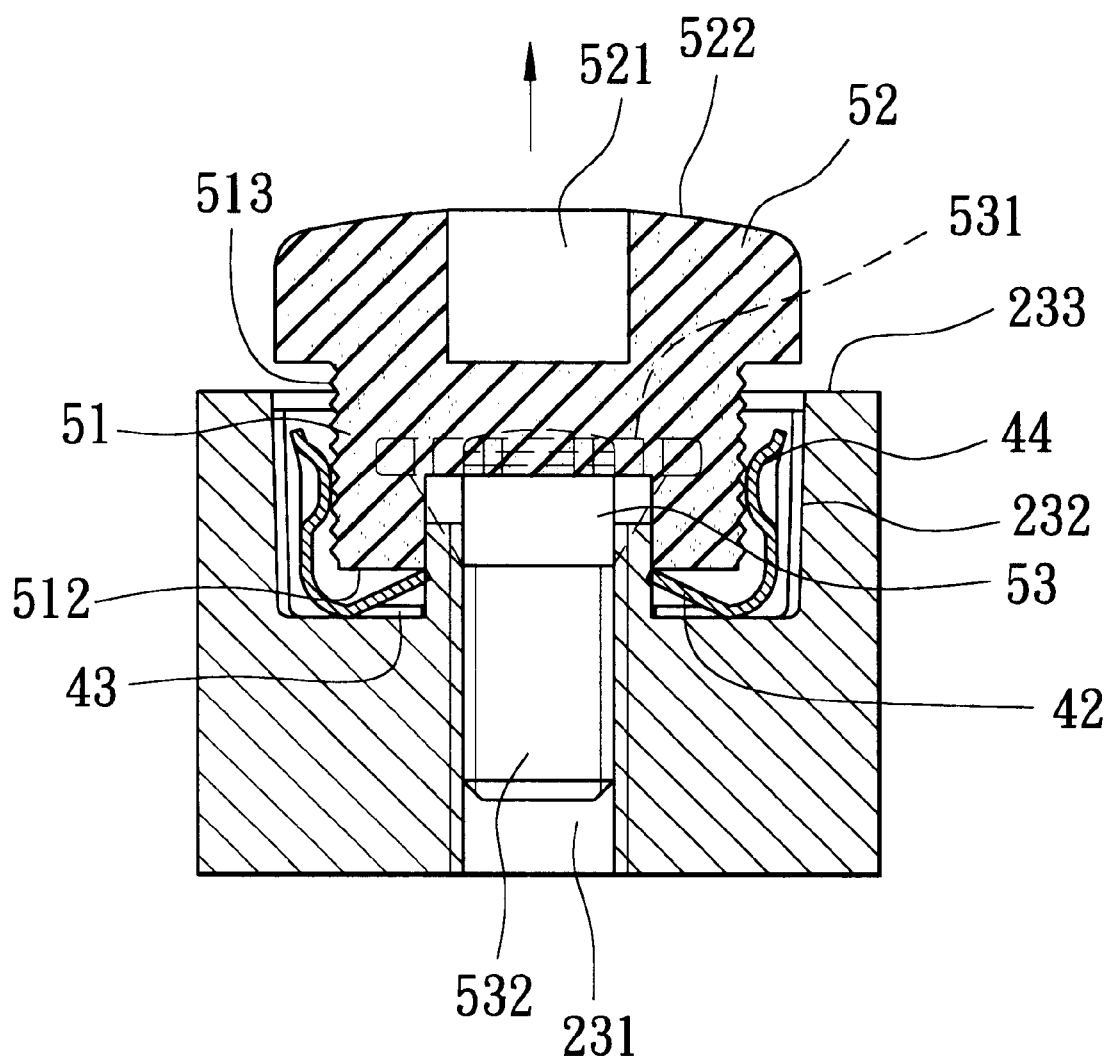
FIG. 6 is a schematic sectional view illustrating the anti-slip member in an adjusted state.

When the contact portion 52 of the anti-slip block 501 wears out, the tool bit engages the bit engaging groove 521 of the contact portion 52 so as to drive the anti-slip member 50 to rotate relative to the respective one of the left and right lateral walls 213, 214, thereby adjusting a protruding height of the contact portion 52 relative to the top side 233 of the respective one of the distal parts 23 of the left and right lateral walls 213, 214, as best illustrated in FIG. 6. As such, proper contact of the anti-slip blocks 501 with the cyclist's shoe sole can be maintained to ensure the anti-slipping effect.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A bicycle pedal assembly adapted to be mounted on a bicycle pedal shaft, comprising:
    a one-piece pedal body including a longitudinal tubular portion adapted to be mounted rotatably on the pedal shaft, and left and right lateral walls extending transversely and oppositely from said tubular portion, each of said left and right lateral walls having a distal part remote from said tubular portion, said distal part having a top side formed with an upwardly opening recess that is confined by an annular wall, said recess further having a bottom that is formed with an internally threaded fastener hole; and
    a plurality of anti-slip members, each of which includes
        a screw having a shank that threadedly engages said fastener hole in said recess in a respective one of said left and right lateral walls, and a head that is formed on one end of said shank, and
        an anti-slip block made from an elastomer and having an anchoring portion secured to said head of said screw and received in said recess in the respective one of said left and right lateral walls, and a contact portion extending from said anchoring portion outwardly of said recess and projecting upwardly relative to said top side of said distal part of the respective one of said left and right lateral walls.

2. The bicycle pedal assembly as claimed in claim 1, further comprising a plurality of positioning units, each of which is disposed in said recess in a respective one of said left and right lateral walls and includes
    an annular base plate disposed on said bottom of said recess and having an outer periphery, and
    a plurality of resilient clamping strips that extend upwardly from said outer periphery of said base plate, that are disposed around said anchoring portion of said anti-slip block which is received in said recess, and that cooperate to apply radial inward clamping forces on said anchoring portion of said anti-slip block.

3. The bicycle pedal assembly as claimed in claim 2, wherein each of said clamping strips has an end part remote from said base plate and dented radially and inwardly for abutting against said anchoring portion of said anti-slip block.

4. The bicycle pedal assembly as claimed in claim 2, wherein said anchoring portion of said anti-slip block has a roughened peripheral wall surface for enhanced traction with said clamping strips.

5. The bicycle pedal assembly as claimed in claim 2, wherein said base plate is formed with a through hole that permits extension of said shank of said screw in said recess therethrough, said through hole being defined by an inner periphery of said base plate, said base plate further having a plurality of resilient urging tabs that extend in radial inward directions from said inner periphery of said base plate, that are disposed around said shank of said screw in said recess, and that extend upwardly and inclinedly to abut against and engage a bottom surface of said anchoring portion of said anti-slip block which is received in said recess.

6. The bicycle pedal assembly as claimed in claim 1, wherein said contact portion of said anti-slip block has a top surface formed with a bit engaging groove that is adapted to engage a tool bit for driving said anti-slip member to rotate relative to the respective one of said left and right lateral walls, thereby adjusting a protruding height of said contact portion relative to said top side of said distal part of the respective one of said left and right lateral walls.

7. The bicycle pedal assembly as claimed in claim 1, wherein said anti-slip block is formed on said head of said screw by injection molding.

8. The bicycle pedal assembly as claimed in claim 1, wherein the elastomer is polyurethane.

9. The bicycle pedal assembly as claimed in claim 1, wherein said pedal body includes a front pair of said left and right lateral walls and a rear pair of said left and right lateral walls.

10. The bicycle pedal assembly as claimed in claim 9, wherein said pedal body further includes a front wall interconnecting said front pair of said left and right lateral walls, and a rear wall interconnecting said rear pair of said left and right lateral walls.

* * * * *